Feb. 18, 1964   J. N. GOLDMAN ETAL   3,121,417
AQUARIUMS AND THREE-DIMENSIONAL DISPLAY THEREFOR
Filed Oct. 18, 1962   2 Sheets-Sheet 1
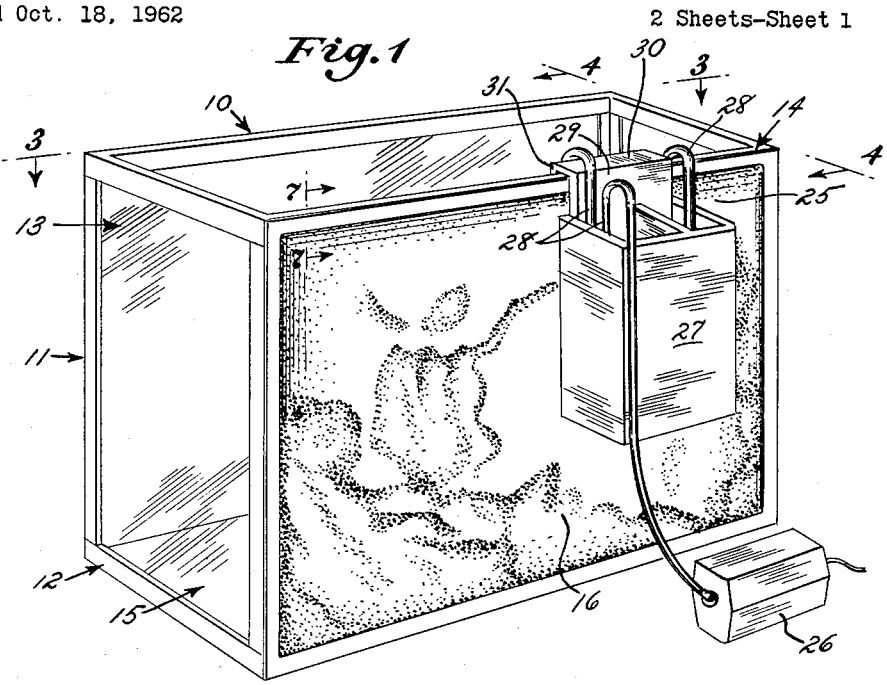
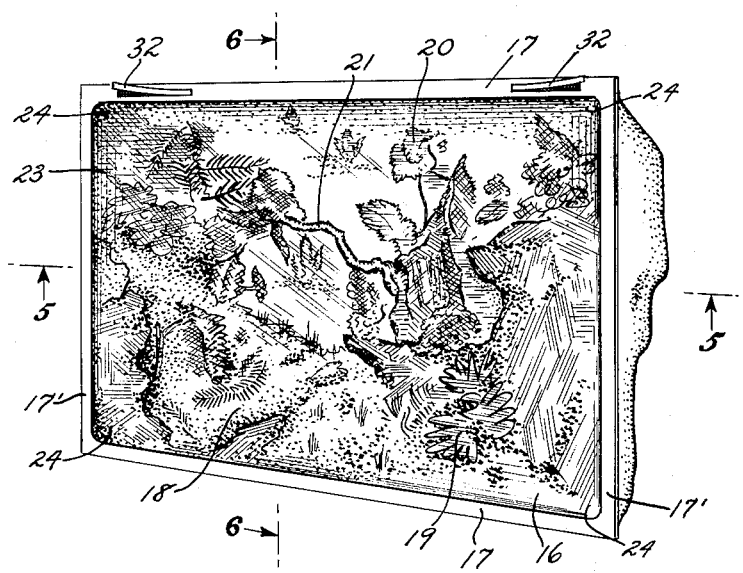
INVENTORS
JEROME NORMAN GOLDMAN
MARVIN ALAN GOLDMAN
BY
Murray M. Grill Feb. 18, 1964          J. N. GOLDMAN ETAL          3,121,417
           AQUARIUMS AND THREE-DIMENSIONAL DISPLAY THEREFOR
Filed Oct. 18, 1962                                 2 Sheets-Sheet 2
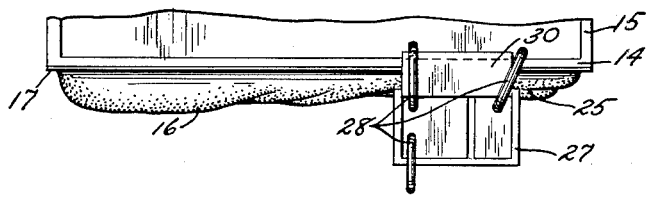
*Fig.3*
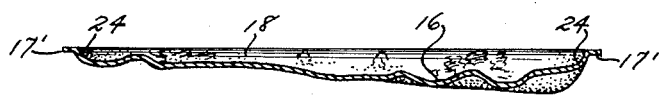
*Fig.5*
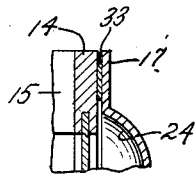
*Fig.6*
*Fig.7*
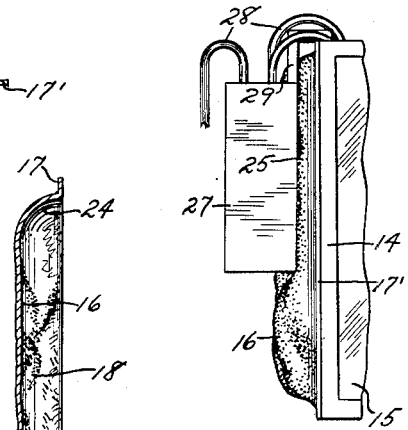
*Fig.4*
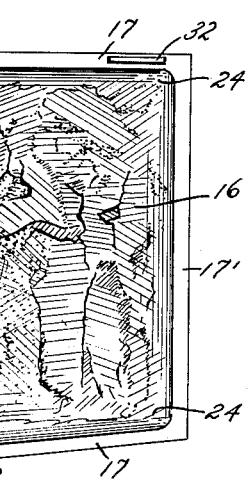
*Fig.8*
INVENTORS
JEROME NORMAN GOLDMAN
MARVIN ALAN GOLDMAN
BY
*Murray M. Grill*

United States Patent Office 3,121,417
Patented Feb. 18, 1964

3,121,417
AQUARIUMS AND THREE-DIMENSIONAL
DISPLAY THEREFOR
Jerome N. Goldman, 9322 Ave. B, Brooklyn 36, N.Y.,
and Marvin A. Goldman, Brooklyn, N.Y. (79—19
149th Ave., Howard Beach, Queens, N.Y.)
Filed Oct. 18, 1962, Ser. No. 231,449
11 Claims. (Cl. 119—5)

The present invention relates to improvements in aquariums and, more particularly, to a three-dimensional background display for use in combination with said aquariums and parts thereof, as hereinafter described and claimed.

It has been suggested to attach pictures to acquariums in various ways. Invariably, such pictures have been of a two-dimensional character such as a decalcomania paper containing an adhesive film over the front of the picture for pasting it to the outer rear glass wall of a tank in order to simulate a scene or add an ornamental effect. Such product has been found to necessarily result in an obviously artificial appearance upon visual observation due to its characteristic two-dimensional nature. The scene may be further distorted due to the entire picture being pressed by means of the overlying adhesive film to the glass wall of the tank. It has been proposed also to attach similar ordinary pictures to specific types of aquariums having modified mechanical structure for such attachment. These articles tend to produce an artificial effect also and have not been found to be of commercial or general utility, nor applicable to ordinary home aquariums. Vairous other disadvantages are inherent in such picture-attached aquariums depending upon the particular product attached, including such possible defects as difficulty or inconvenience in installation, removal, restriction to use with tanks of particular structure or size, or for a single application only, etc., in addition to the inherent defects as to artificial appearance, shape or configuration of the scene.

It has been found that the foregoing disadvantages and similar defects can be overcome by a particular three-dimensional display article adapted for use in combination with the aquarium and certain accessory parts thereof such as an outside filter as hereinafter described.

Accordingly, it is a principal object of the present invention to provide a three-dimensional background display for use with an aquarium which results in a markedly enhanced natural or realistic appearance of the particular scene in the display.

It is another object of this invention to provide an aquarium comprising an aquarium tank in combination with said background display which enhances the attractiveness of the unit.

It is a further object of this invention that the display is a relatively thin-walled, stiff thermoplastic material having a decorative coating thereon with both shallow and deeply recessed portions in the background.

It is another object to provide for a relatively flat section on the rear of said display to permit the positioning thereon and attachment to the aquarium of accessory devices.

A further object is to provide pressure-sensitive means on a part of the border of the display to enable ready attachment, removal and interchangeability.

Other and further objects and advantages will be manifested from the following description when taken in conjunction with the annexed drawings.

To the accomplishment of the foregoing and related ends, the present invention then consists of the means hereinafter fully described and particularly pointed out in the claims, the annexed drawings and the following description setting forth in detail certain means in carrying out the invention, such disclosed means illustrating, however, but several of the various ways in which the principles of the invention may be employed.

Broadly stated, the invention relates to a three-dimensional background display for use attached to an aquarium which comprises a border surrounding said display lying in a plane and adapted to contact the frame or border of the outside transparent wall of an aquarium and a background in relief connected to said border, said background area being offset laterally in varying distances from said plane and forming a three-dimensional display which enhances the attractiveness of the aquarium upon visual observation. The resulting display, even in the case of representation of a natural scene, produces an attractive, realistic effect when viewed through the water of the tank.

The present invention is illustrated, by way of example, in the accompanying drawings in which:

FIG. 1 is a rear view of the three-dimensional background display in combination with an aquarium and having a filter attached thereto;

FIG. 2 is a front perspective view of the background display with the shading and view of the rear section illustrating the three-dimensional structure;

FIG. 3 is a top view of the part of the aquarium of FIG. 1 seen along lines 3—3;

FIG. 4 is a side view of said section of the aquarium taken on lines 4—4;

FIG. 5 is a cross-sectional view taken on lines 5—5 of FIG. 2;

FIG. 6 is a sectional view seen along the lines 6—6 of FIG. 2;

FIG. 7 illustrates a preferred means of attachment of said display to the back of the aquarium; and FIG. 8 illustrates a variation of the three-dimensional theme showing a front perspective view of a grotto-like display.

Referring to the drawings in detail, and FIG. 1 particularly, the aquarium tank 10 comprises a front supporting frame section 11, base 12, and rear frame section 14 with transparent front and rear sides 13 and end panels 15 so as to form a suitable water-tight receptacle which is to be filled with water to the desired level and to contain the exhibits such as aquatic plants, reptiles and animals, particularly fish. The aquarium tank 10 is illustrated as rectangular and preferably has glass or other transparent material on all sides of the container. The bottom and side panels may be of an opaque or translucent character if desired. It is understood that the frame 11 is composed of any suitably rigid material such as painted or stainless steel, plastic, aluminum, etc. The corners are securely joined in the usual manner, preferably to form right angles. The glass plates fit into cleats, guides or tracks in the usual manner so as to form a rigid frame. It is to be understood that the invention is applicable to aquaria of any desired shape or design, and is particularly suitable for the rectangular tanks available in varying sizes for home use.

The three-dimensional background display 16 is attachable to the outside rear wall 14 of the tank 10 as more fully described hereinafter. Referring particularly to FIGS. 2 and 8, this display 16 comprises a border 17 or edging which preferably extends along the entire periphery of the article. This border 17 is advantageously in the form of an outwardly-extending flange and in the same plane generally as the rear wall 14 of the tank so as to permit intimate contact of the two surfaces and facilitate their engagement. The background display 16 is illustrated as rectangular also so as to conform with the shape and size of the illustrated tank 10. Thus, the flat edges of the border 17 may be pressed to the opposing rear, flat, rigid surfaces of frame of the tank 10 and fixed into position so as to appear as a unitary or fitted combination resulting in a neat and attractive appearance. The intimate contact of the border 17 with the corresponding frame 14 of rear side 13 functions as a seal to prevent or substantially inhibit the introduction of dirt, dust and side light which may tend to interfere or adversely affect the depth perception of the three-dimensional display also as viewed through the front glass 13 of the tank 10.

It is a preferred embodiment of the present invention that the flat border 17 of the display article be of a width and/or a height which is at least as great and preferably greater than the corresponding width or height of the opposing rear surfaces of the rigid frame members so that each display article is adaptable to similarly-shaped and sized tanks, allowing for minor variations in size. In general, home aquarium tanks are available in a number of basic sizes. For example, one group of tanks may be approximately 20 inches in length with varying heights, another group may be about 30 inches in length with varying heights, etc. The presence of an oversize border or one of relatively substantial width, e.g., about one-quarter to one inch, permits trimming of the border of the display article to narrow its size if necessary in order to obtain a desired fit to the rear frame section 14. In those sizes where the article is provided with special attaching means on the upper border as illustrated in FIG. 2, the extra width of the border for trimming is preferably on the side border surfaces 17'. In those sizes having the attaching means on the side borders 17', the extra width is preferably on the top and/or bottom borders 17. For example, tanks of approximately 18 to 20 inches in length can be fitted with the display article of 20 inches in length with a trimmable border of about one inch on each side.

The inner background picture or scene of the display article is recessed or offset laterally from the border of the display article at varying distances to provide a depth perspective. The scene should be in bas or high relief in at least a substantial portion so as to produce a particularly realistic effect. To the observer, there is created or results a shadow-box effect and an illusion of substantial depth which enhances the beauty and realism of the actual scene illustrated therein. In viewing the scene from the front of the tank, the water in the tank (in combination with the front and rear glass panels) acts as the prism of a magnifying glass so that the depth perception is enhanced markedly. For example, a cave area or similar relatively deeply recessed section may be recessed in fact only about 2 inches from the border; nevertheless, an illusion of much greater depth is created, e.g., possibly an estimated 6–12 inches, resulting in a more striking effect. Similarly, a relatively shallow point or section which may be approximately in the same plane as the border and which projects from the background adjacent to a deeply recessed portion produces a greater overall appearance of depth. In viewing the scene, the observer cannot easily focus on one point as in the case of an ordinary picture having a flat plane. The impression achieved in viewing the three-dimensional scene of the present invention then can be described as a sense or feeling of infinity or depth when even attempting to focus on a particular point or area. The varying relief in different portions of the scene tends to diffuse the direct lighting so that there is achieved the realistic effect of shadows and highlights depending upon the particular scene and selected effects or impressions desired.

There are additional preferred features of the present invention which reside in the manner of illustration of the background scene so as to enhance its beauty and realism, regardless of the particular scene illustrated. In FIG. 2, there is illustrated an underwater landscape scene with plants, leaves, tree branches, various rock formations, etc., which should have an appropriate color scheme, viz. greenish leaves, brownish rocks, etc. In FIG. 8, an underground grotto configuration is illustrated which naturally tends to have less color display and detail than the scene of FIG. 2. As general guiding principles which will be modified as desired dependent upon the specific scene, it has been found that details of the scene are, at least in part, preferentially disposed in the shallow sections (or areas or points) so that they are in the front or foreground of the display which tend to highlight such details, make them more observable and direct attention thereto if so desired.

FIG. 2 has the plant 19 in the right corner and the leaves 20 positioned in part in the foreground of the picture and the tree branch 21 in the center of the picture is raised or projected from the background so as to emphasize these details. Referring to FIG. 8 which represents a grotto, the innermost portions or bottom surfaces of the rocks should preferably have relatively light or highly reflective colors such as resulting from the use of metallic colors in order to bring out the innermost details. It has been found also that it is desirable to have a high or deep relief in at least one portion so as to have a V- or U-shaped cavity resulting in a forced perspective. It is preferred that such cavity or channel point inwardly or upwardly, e.g., wherein the horizontal spacing is relatively wide at the bottom and tends to narrow upwardly. At least one such modification is desirable where the theme of the display permits such representation. This structure is best illustrated by FIG. 8 in which cave 22 represents a triangular cave effect resulting in a channel or way which is wide at the bottom and appears to narrow with converging sides (at least in part) upwardly so that the channel appears to narrow to an imaginary vanishing or meeting point. Such structure in effect increases the depth by creating increased depth perspective.

The color scheme should be integrated with the effect produced by the water and the 3-dimensional background. In general, the presence of the water contained between the two transparent glass walls tends to tone down color and possibly produce a haze-like effect. As a result, it is considered advisable to make the color scheme brighter than contemplated in such sections where precise color tones are desired.

It is apparent that the background display can be illustrated by any desired scene, landscape, or pictorial representation or decoration, and the invention is obviously not restricted to any particular scene. The illustrations needs not be limited to underwater scenes but can represent any picturesque or attractive display of general or specific interest. For example, there may be portrayed or illustrated a natural-like landscape of hills, mountains, trees, shrubbery, bridges, rivers, falls, etc., or views of buildings, vehicles, imitation animals or people, or other objects so as to furnish particular ornamental effects or themes as desired.

It is a further preferred embodiment of the present invention that the sides 23 of the background display slope inwardly from the inner edge of the border 17 and 17', and terminate in a rounded or irregularly-shaped junction or corner 24 with the adjacent rear or frontal background surface 16. Thus, these sides of the background can be said to form obtuse angles with the inner edge of the border and with the rear background surface. In this manner, there are no sharp or definite lines or points at which the sides 23 meet with the background 16. To the observer, it appears that there is a continuous surface due to the gradual merging of the walls which enhances the attractiveness and realism of the scene. In addition, the curve-like nature of this structure proves to be advantageous in the manufacture of the display, particularly where the article is formed on a die or in a mold and has to be removed therefrom, and in the application of the colors. As a result, there is obtained improved ease of manufacture and economy.

The fact that the display is three-dimensional and has both shallow and deeply recessed portions is particularly advantageous and functional for use with an aquarium and its component parts. Since this article is relatively thin-walled, such as formed from a plastic sheet of .02 inch thickness on a form, the back or rear surface has projections or raised areas of varying degree corresponding to the shallow or deeply-recessed areas in the picture. The opposite three-dimensional character of the back is illustrated particularly by the shading and dotted lines in FIG. 1 and is evident from the low and high projections respectively as illustrated in the other figures.

It is a particular feature of the present invention that the back has an area 25 situated near or adjacent to the top which projects slightly from the border. This area or section should be relatively flat (though the surface will be irregular due to the three-dimensional nature of the picture) and of sufficient width and height so as to permit the positioning thereon behind the display and the attachment to the aquarium tank of certain accessory devices normally used in connection with an aquarium. Such feature is illustrated particularly in FIGS. 1, 3 and 4 which disclose the attachment of a conventional filter arrangement for filtration, circulation and aeration of the water. The pump 26 may be situated conveniently behind the background display with suitable tubing leading to the filter stem. The filter box 27 has the usual outlet and inlet tubes 28 respectively.

The filter box 27 can be mounted to the back of the aquarium tank in any suitable manner. A conventional type illustrated in FIG. 1 has an inner wall 29 extending upwardly and connected with means for its removable attachment to the aquarium wall. For example, the inner wall 29 is shown as integral with the outwardly extending flange 30 which is turned down at its edge so as to form a hook-like member or sleeve 31 which is positioned over the rear wall of the tank and acts as a support for the filter box 27. The outside filter boxes commercially available for home use are in a variety of basic sizes also. Typical boxes are rectangular (to substantially square) in outline, e.g., a length of 3½ to 6 inches, a width of 1½ to 2½ inches and a height of about 6 inches. The overhanging ledge 30 for attachment to the aquarium tank usually is about one inch in width to provide for varying thicknesses of the rear tank wall which is usually about ¼ to ½ inch in small home aquariums.

The rear portion 25 of the background display should desirably have the relatively flat surface of sufficient width and length to accommodate a standard filter box for the particular size tank, but preferably is able to permit the use of a plurality or variety of filter boxes as an accommodation to the owner. The corresponding frontal portion of the display should then be relatively shallow. The picture in such area should not be recessed more than the unused width of the flange or hook of the filter box which extends over the tank wall. The display furnishes the added advantage of hiding the filter box, tubing, pump, and other accessory articles from the viewer so as to enhance the attractiveness of the aquarium.

Any suitable means may be employed for attachment of the background display to the tank wall and it may be removably or permanently so affixed as desired by adhesive, tape, hooks, etc. as desired. The flat border 17 provides an excellent surface adapted for attachment to the frame of the tank by any convenient means, preferably by use of an adhesive.

Another embodiment of the present invention resides in the presence of a suitable adhesive means on one or more sides of the border which can be readily utilized by the consumer and which permits its easy removal and re-use, and also interchangeability of the various displays as desired. Such means is illustrated by the pressure-sensitive tape illustrated in FIG. 2 and detailed in FIG. 7 when attached to the aquarium. Any suitable commercial pressure-sensitive tape can be used such as Mylar tape. It comprises an outer tape layer or film 32 which has a smooth, uncoated exterior as a masking tape and is adapted to protect the adhesive prior to use. For attachment, the outer tape 32 is removed and the inner tape 33 having the adhesive pressure-sensitive film is merely pressed to the frame of the tank at the appropriate positions so as to seal the two members together. In general, there should be at least two such spaced means for attachment so that the display is firmly attached along at least one side, though similar tape means may be situated on two or more sides as desired.

The three-dimensional background display is manufactured in any suitable manner. The material should be sufficiently rigid so that it retains the three-dimensional form during use under home conditions and permit normal handling, shipping, etc.

It is preferred that it be composed of a suitable plastic material of sufficient thickness and rigidity for such purposes. More particularly, it should be formed desirably from a relatively thin-walled, e.g., .02″ sheet of a permanently deformable or form-retaining thermoplastic material suitable for application of the desired theme or color scheme. The use of extruded sheets of suitable low-oriented plastics such as polystyrene; polyvinyl chloride, acetate, butyrate, etc., has been found to be particularly suitable for the display. Various forming operations for the three-dimensional shape and application of the desired color scheme may be employed depending upon the particular scene desired. The sheet may be subjected to various known atmospheric pressure forming or fluid pressure, e.g., vacuum, forming methods to produce the desired three-dimensional shape from a suitable form. It is understood that suitable laminated materials or backings may be used also.

A suitable method involves clamping the plastic sheet of approximate size in a frame over a mold or form. The sheet is heated to the point of flexibility (varying with the material) and a vacuum is created whereby the pliable sheet is pulled down onto a mold or form. The sheet sets shortly and may be removed and cooled in the usual manner. The desired color scheme may be applied as desired by brushing or spraying differently colored materials on the pre-selected areas or portions and thus form a coating integral with the display. It is understood that the paints, inks or dyes employed will be compatible with the plastic and strong enough to adhere and form a suitable bond. Any suitable coloring materials may be used such as silk screen paints, inks, lacquers, metallic paints, etc. The articles exhibiting caves and the like are preferably prepared with at least the partial use of metallic paint, particularly shades of orange, red, brown and/or gold as desired. Alternatively, the color scheme may be initially printed, stamped, pressed or otherwise applied to the plastic sheet which may then be pressed to desired shape on the form.

Although the present invention has been described with respect to certain embodiments, it is apparent that various modifications and changes may be made without departing from the true scope and spirit of the present invention as defined by the following claims:

What is claimed is:

1. An aquarium comprising in combination an aquarium tank having front and rear transparent walls and having a rigid supporting frame along the border of said rear transparent wall and a three-dimensional accessory decorative article removably positioned on the outer rear transparent wall, said article comprising a unitary, relatively thin-walled thermoplastic material having an outwardly-extending flange along its border lying in a plane removably attached to said supporting frame so as to conform with the shape and size of said frame and tending to seal said flange thereto, said article having a background in permanently deformed relief connected to said border by sides sloping inwardly from the inner edge of said flange, said background being recessed laterally in varying distances from said plane and forming a three-dimensional pattern in positive relief of projections and depressions substantially throughout said background and a corresponding reverse pattern on the rear surface thereof, said pattern having a decorative scene on the front surface and forming a three-dimensional decorative scene in positive relief having enhanced depth perception when viewed through the transparent walls and water of said aquarium, said scenic background having a relatively shallow recessed portion adjacent to the top thereof so that the reverse pattern on said rear surface has an area adjacent to the top thereof adapted to permit the positioning behind and concealment of an aquarium accessory normally positioned on the outside rear wall of said aquarium.

2. An aquarium comprising in combination an aquarium tank having front and rear transparent walls and having a rigid supporting frame along the border of said rear transparent wall and a three-dimensional accessory decorative article removably positioned on the outer rear transparent wall, said article comprising a unitary, relatively thin-walled form-retaining material having an outwardly-extending flange along its border lying in a plane and attached to said supporting frame so as to conform with the shape and size of said frame and tending to seal said flange thereto, said article having a background in permanently deformed relief connected to said border, said background being recessed laterally in varying distances from said plane and forming a three-dimensional pattern in positive relief substantially throughout said background, said pattern having a decorative scene on the front surface and forming a three-dimensional decorative scene in positive relief having enhanced depth perception when viewed through the transparent walls and water of said aquarium.

3. An aquarium in accordance with claim 2 wherein said background has on its rear surface an area relatively shallow in height adjacent to the top adaptable for the positioning of a filter box thereon, said filter box having means thereon for attachment to the aquarium wall.

4. An aquarium in accordance with claim 2 containing pressure-sensitive adhesive means disposed between the border of said article and the rear of said supporting frame of said aquarium and removably attaching said article to the aquarium.

5. A three-dimensional aquarium accessory decorative article for removable attachment to an outer rear wall of an aquarium having front and rear transparent walls and a rigid supporting frame along the border of said rear transparent wall which comprises a unitary, relatively thin-walled thermoplastic material having an outwardly-extending flange along its border lying in a plane and adapted to be removably attached to said supporting frame so as to conform with the shape and size of said frame and tending to seal said flange thereto, said article having a background in permanently deformed relief connected to said border by sides sloping inwardly from the inner edge of said flange, said background being recessed laterally in varying distances from said plane and forming a three-dimensional pattern in positive relief of projections and depressions substantially throughout said background and a corresponding reverse pattern on the rear surface thereof, said background having a decorative scene on the front surface thereof and forming a three-dimensional decorative scene in positive relief having enhanced depth perception when viewed through the transparent walls and water of said aquarium, said scenic background having a relatively shallow recessed portion adjacent to the top thereof so that the reverse pattern on the rear surface has an area adjacent to the top thereof adapted to permit the positioning behind and concealment of an aquarium accessory normally positioned on the outside rear wall of said aquarium.

6. A three-dimensional aquarium accessory decorative article adapted for removable attachment to the outer rear wall of an aquarium having front and rear transparent walls which comprises a unitary, relatively thin-walled form-retaining material having an outwardly-extending flange along a border thereof lying in a plane and adapted to be removably attached to said aquarium, said article having a background in permanently deformed relief connected to said border, said background being recessed laterally in varying distances from said plane and forming a three-dimensional pattern in positive relief substantially throughout said background, said three-dimensional background having a decorative scene on the front surface and forming a three-dimensional decorative scene in positive relief which enhances the attractiveness of said aquarium when viewed through the transparent walls and water of said aquarium.

7. An aquarium article in accordance with claim 6 wherein the sides of the background article slope inwardly from the inner edge of said border.

8. An aquarium article in accordance with claim 6 wherein the background in relief has a cavity with narrowing sides and creating increased depth perspective.

9. An aquarium background article in accordance with claim 6 wherein the rear surface of said article has an area adjacent to the top projecting relatively low in height and adapted to permit the positioning thereon of an aquarium accessory normally attached to the aquarium.

10. An aquarium background article in accordance with claim 6 wherein the border on at least one side thereof is a flange of substantial width adapted for attachment to a plurality of aquarium tanks having minor variations in size.

11. An aquarium article in accordance with claim 6 having pressure-sensitive means thereon for attachment to the outside of the aquarium.

References Cited in the file of this patent

UNITED STATES PATENTS

| | | |
|---|---|---|
| 475,404 | Lochmann | May 24, 1892 |
| 1,428,058 | Pitts | Sept. 5, 1922 |
| 1,838,215 | De Clairmont | Dec. 29, 1931 |
| 2,144,551 | Skolnick | Jan. 17, 1939 |
| 2,293,612 | Montague | Aug. 18, 1942 |
| 2,634,529 | Burdick | Apr. 14, 1953 |
| 2,651,128 | Burdick | Sept. 8, 1953 |
| 2,663,960 | Cerracchio | Dec. 29, 1953 |
| 2,879,742 | Morrill | Mar. 31, 1959 |
| 3,059,091 | Wenzel | Oct. 16, 1962 |